May 19, 1970     H. PETERSON     3,512,613
WHEEL CHOCK AND TRACTION DEVICE FOR VEHICLES
Filed July 3, 1968
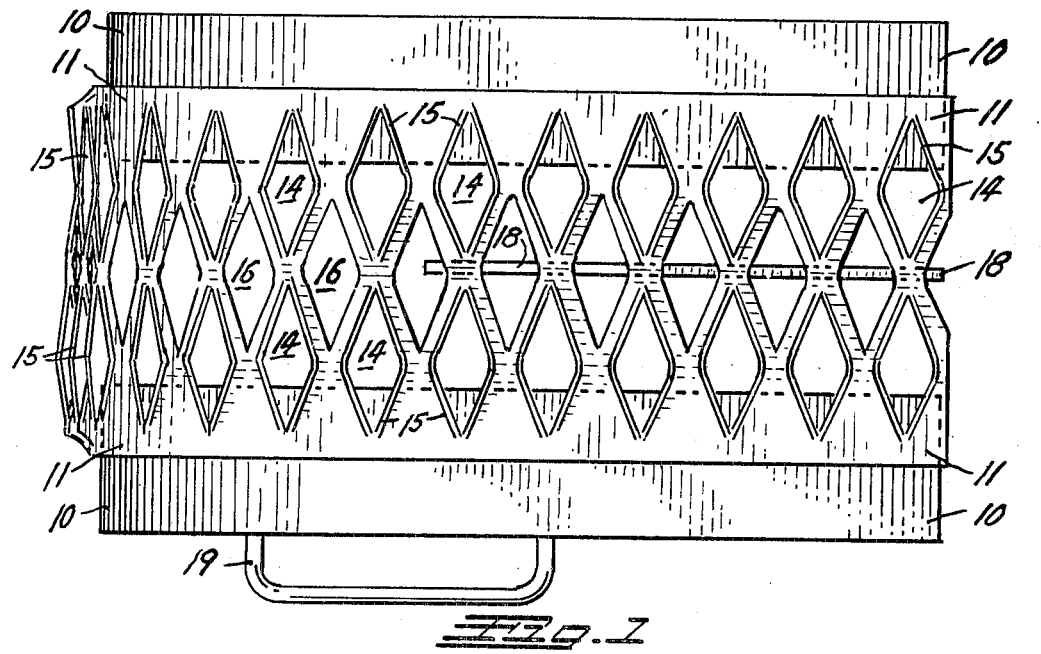
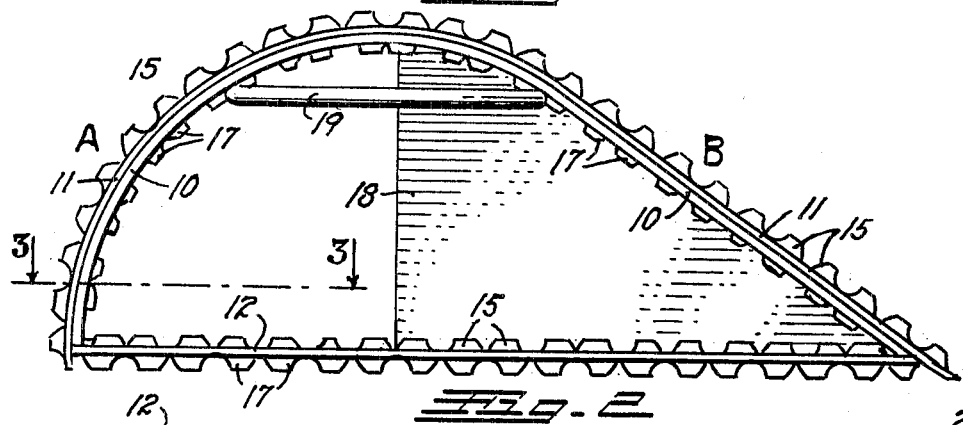
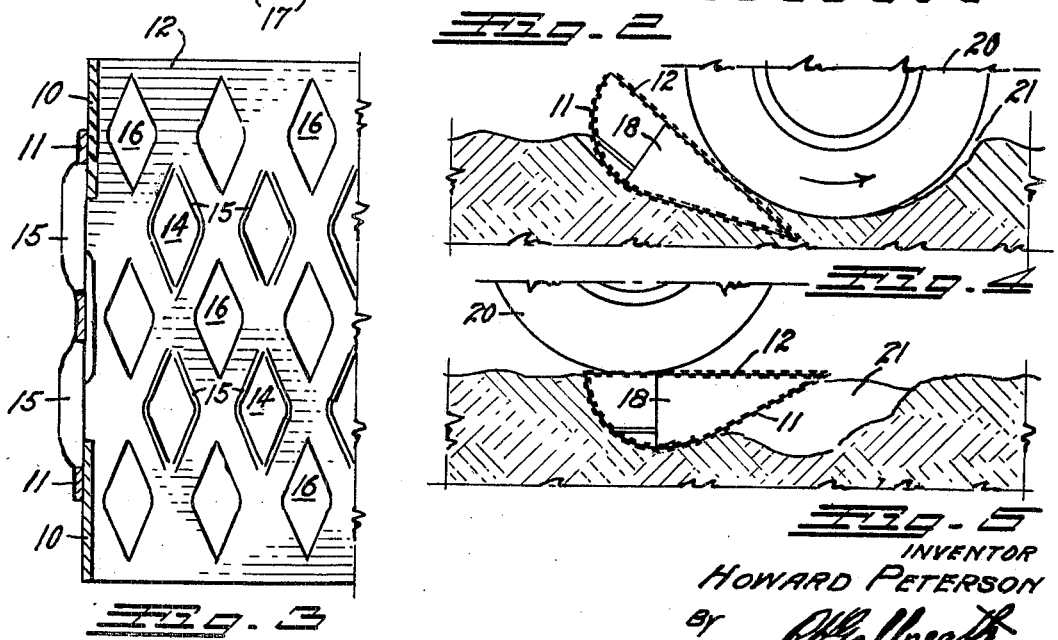
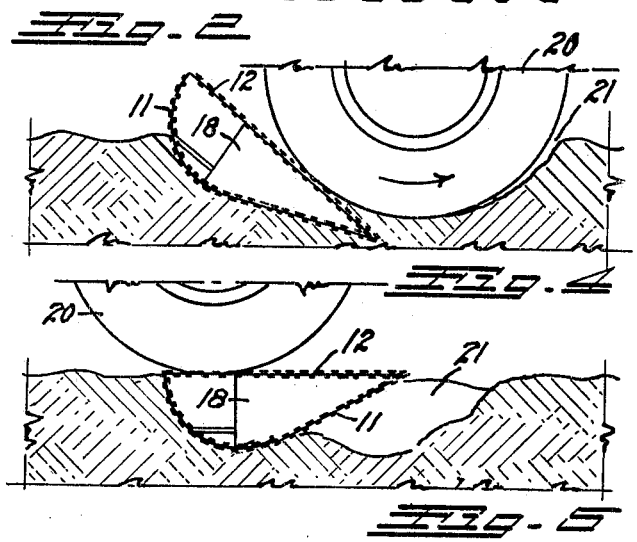
INVENTOR
HOWARD PETERSON
BY
ATTORNEY United States Patent Office 3,512,613
Patented May 19, 1970

3,512,613
WHEEL CHOCK AND TRACTION DEVICE FOR VEHICLES
Howard Peterson, Denver, Colo., assignor of one-third each to Patricia J. Kewley, Denver, Colo., and Marilyn Anne Perreten, Denver, Colo.
Filed July 3, 1968, Ser. No. 742,315
Int. Cl. B60t 3/00
U.S. Cl. 188—32                         5 Claims

ABSTRACT OF THE DISCLOSURE

An upwardly arched steel support covered upon its upper arched surface by a similarly arched, perforated, indented, traction plate, of the type commercially known as "Grip Struts," welded thereto, the lower extremities of the upwardly-arched support being connected together by a flat, horizontal, perforated, indented "Grip Struts" base plate welded thereto and extending therebetween.

---

This invention relates to a metallic wheel chock and traction device for vehicles such as automobiles, trucks, trailers, airplanes and the like for resisting ground movement of the supporting wheels thereof.

The principal object of the invention is to provide a convenient, one-piece, chock device which can be easily carried and quickly placed in, and removed from, a wheel-holding position; which will efficiently and safely resist relatively large compression stresses; and which will exert extreme traction upon both the wheel and the ground or other supporting surface.

A further object is to provide a highly efficient wheel chock which can also be used as a traction element to provide traction for a vehicle drive wheel which has become embogged in mud, sand, slush or snow.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of the improved wheel chock and traction device of this invention;

FIG. 2 is a side elevational view thereof as it would appear when serving as a wheel chock;

FIG. 3 is a fragmentary sectional view looking downwardly on the line 3—3 in FIG. 2; and FIGS. 4 and 5 are diagrammatic views showing how the device could be used to provide traction to a drive wheel which has become mired in a depression.

Referring to FIGS. 1 and 2, it will be seen that the improved chock device is a unitary assembly consisting of two, similar, spaced-apart, upwardly-arched frame strips 10 which support a similarly arched tread plate 11 above a flat, horizontal base plate 12.

The frame strips 10 are preferably formed from relatively narrow strips of structural steel plate having a size and thickness suitable for the intended use. In actual practice, strips of steel plate ⅛" thick, 2" wide and 15½" long have been found to be universally satisfactory. The strips are similar, and each is arcuately bent, at one end, on a semi-cylindrical arc of substantially 4" radius to form a rounded portion A one one end of the device. The other end of each strip is straight and inclines tangentially from the arc to form an inclined portion B at the other end of the device.

The tread plate 11 and the base plate 12 are formed from elongated structural gratings such as conventionally used for non-slip floors, stair treads and platforms in manufacturing plants, power houses and the like to provide slip resistance in all directions. Such gratings are available on the open market and are commercially known as "Grip Strut Safety Gratings." They are stamped from elongated metallic plates to form longitudinally-extending rows of transversally-positioned, somewhat diamond-shaped perforations 14 surrounded by upwardly-extending traction flanges 15 and similar diamond-shaped intermediate perforations 16 surrounded by peripheral, downwardly-extending traction flanges 17. The intermediate perforations 16 are positioned between the rows of perforations 14 and in staggered relation therewith, as shown in FIG. 1.

The "Grip Struts" are commercially obtainable in various widths with various numbers of openings in the rows. In this invention, the grip strut forming the tread plate 11 is formed from a relatively narrow (4¾") "grip strut" having two rows of upwardly-flanged perforations 14 and one intermediate row of downwardly flanged perforations 16. The base plate 12 is formed from a relatively wide (7") grip strut having three rows of downwardly-flanged perforations 16 and two intermediate rows of upwardly-flanged perforations 14. The outer edges of the two frame plates 10 are vertically aligned with the outer edges of the base plate 12 so as to space their inner edges apart and the tread plate 11 is upwardly arched, to correspond to the contour of the frame plates, and is welded thereto at convenient intervals along its outer edges to cover the medial space between frame plates. The base plate 12 is welded at its extremities to the two downwardly-facing extremities of the frame plates 10 and extends therebetween to form a bottom in the arch of the frame plates 10 and to rigidly maintain the arch therein. The arch is additionally supported by means of a substantially triangular strut plate 18 which is medially and vertically positioned between the straight inclined portion B of the tread plate 11 and the base plate 12 and is welded to both at convenient intervals along its upper and lower edges. A U-shaped carrying handle 19 is welded at its spaced extremities beneath one of the frame plates 10 and projects therefrom to form a convenient hand grip.

For use as a wheel chock, the device is positioned, as shown in FIGS. 1 and 2, on the supporting surface in alignment with the wheel path and with either extremity of the tread plate 11 in engagement with the tread of the wheel. It can be seen that the outwardly-projecting traction flanges 17 on the tread plate 11 will interengage the tread of the wheel and the downwardly-projecting flanges 15 on the base plate 12 will interengage the supporting surface. The greater the pressure on the chock the greater will be the interengagement so that the wheel will be effectively locked against traveling.

For use as a traction device for providing traction for a drive wheel 20 which is mired in a mud hole, such as illustrated at 21 in FIG. 4, the device is preferably, but not necessarily, inverted and the extremity of the inclined portion B of the device is forced into the ground forwardly of the wheel with the flanges 17 of the base plate 12 engaging the tread of the wheel 20 and with the flanges 17 of the tread plate engaging the ground, as shown in FIG. 4. The wheel 20 is then rotated forwardly to climb the base plate. As the wheel approaches the upper extremity of the base plate the latter will be tilted forwardly to align the tread of the wheel with the ground surface, as shown in FIG. 5, so that it may be driven forwardly from the miring hole 21.

While the device could be made with a single frame plate below the tread plate 11, instead of the two spaced-apart frame plates 10, this has not been satisfactory since foreign materials such as mud would pack in the perforations 14 and 16 against the single frame plate and be difficult to remove. With the spaced-apart frame plates 10, as illustrated, all of the perforations in both the tread plate 11 and the base plate 12 are completely open and self-cleaning.

While a specific form of the invention has been described and illustrated herein, it is to be understood that the same may be varied without departing from the spirit of the invention.

Having thus described the invention, what is claimed and desired to be secured by Letters Patent is:

1. A wheel chock comprising:
 (a) a rigid, elongated, continuous, upwardly-arched frame plate having its terminal extremities lying in a common plane and its medial portion arched away from said plane;
 (b) a rigid flat base plate of less length than said frame plate, positioned in said common plane, permanently and fixedly connecting said terminal extremities of said frame plate to each other to rigidly maintain the upward arch therein; and
 (c) an elongated and similarly upwardly-arched tread plate fixedly fitted over said frame plate to provide tractive engagement with the tread of a wheel.

2. A wheel chock and traction device for vehicles as described in claim 1 in which the upward arch in said frame plate and in said tread plate define an arcuate, semi-cylindrical contour at one extremity of said plates and a straight, substantially flat inclined contour at the other extremity of said plates, said flat inclined contour being tangent to said semi-cylindrical contour.

3. A fixed, unitary wheel chock and traction device for vehicles comprising:
 (a) two, similar, elongated, laterally-spaced-apart, longitudinally-upwardly-arched frame strips;
 (b) an elongated similarly upwardly-arched tread plate positioned on and secured to said frame strips and overlaying the intervening space therebetween; and
 (c) a rigid flat, elongated base plate, of less length than said tread plate, fixedly secured at its extremities to the extremities of said upwardly arched frame strips so as to close and permanently maintain the arches therein.

4. A wheel chock and traction device for vehicles as described in claim 3 in which the upward arches in said frame strips and in said tread plate define an arcuate, semi-cylindrical contour at their one extremities and a straight, substantially flat inclined contour at their other extremities.

5. A wheel chock and traction device for vehicles as described in claim 4 having:
 (a) a triangular supporting strut fixedly positioned longitudinally and vertically between said arched tread plate and said flat base plate for fixedly maintaining the flat inclined contour of said tread plate in fixed position.

References Cited
UNITED STATES PATENTS

| | | | |
|---|---|---|---|
| 3,054,477 | 9/1962 | Bustin | 188—32 |
| 2,532,149 | 11/1950 | Cone | 238—14 |
| 3,357,639 | 12/1967 | Peterson | 238—14 |
| 3,387,686 | 6/1968 | Little | 188—32 |

ARTHUR L. LA POINT Primary Examiner

R. A. BERTSCH, Assistant Examiner

U.S. Cl. X.R.

238—14